UNITED STATES PATENT OFFICE.

ELI ROY, OF LEWISTON, MAINE.

CEMENT COMPOUND AND PROCESS FOR MAKING THE SAME.

1,037,836.      Specification of Letters Patent.      Patented Sept. 3, 1912.

No Drawing.      Application filed June 3, 1910. Serial No. 564,873.

*To all whom it may concern:*

Be it known that I, ELI ROY, a citizen of the United States, residing at Lewiston, in the county of Androscoggin and State of Maine, have invented certain new and useful Improvements in Cement Compounds and Processes for Making the Same, of which the following is a specification.

The invention relates to a new and improved cement compound and process of making the same.

The chief objects of the invention are to provide a cement, which can be produced at comparatively low cost and one which can withstand great heat and variations in temperature without cracking after being set, the same being of an elastic character and possessed of great adhering qualities.

My improved cement is composed of the following ingredients; blue clay, fine sharp sand, soda ash and alum. The preferred proportions are substantially blue clay three parts, fine sharp sand nine parts and a very small percentage or trace of soda ash and alum, the quantities of the different materials for a barrel of the cement weighing three hundred pounds being blue clay seventy-five pounds, fine sharp sand two hundred and twenty-five pounds, soda ash two ounces and alum one ounce. These proportions as before intimated are preferred and have been found to give excellent results.

In manufacturing the cement the following process is followed: The soda ash is dissolved in about a pint of water and this solution is boiled with the clay for about two hours, the clay and the soda ash solution being placed in a receptacle with sufficient water to boil the same. After this boiling operation the necessary quantity of sand and a small percentage of alum is next added; the whole is then thoroughly mixed, the mass being preferably placed in a mixing machine; it is then dried by being placed in a drier or by any other suitable means, and finally ground up and placed in bags ready for use.

The purpose of the soda ash is chiefly to make the cement elastic and to increase its adhesive qualities. During the preliminary boiling operation, the mass of clay becomes thoroughly saturated and treated with the soda ash solution.

The cement produced by this process while available as a cement for various purposes is especially adapted and can be employed with particular advantage in furnaces or the like as a bed for the fire brick or to bind and hold the same together and in place. When used as a bed for fire brick, the heat welds the cement and the brick together and as the heat increases or diminishes the cement will expand or contract and not crack and become detached from the brick.

The cement is elastic, will thoroughly adhere to the brick when exposed to great heat, and in cooling off gets very hard.

What I claim is:

1. A cement consisting of the resultant product of the mixture of blue clay, sand, soda ash and alum.

2. A cement consisting of the resultant product of a mixture of substantially three parts clay, nine parts fine sharp sand and a small percentage of soda ash and alum.

3. The process of manufacturing cement consisting in subjecting blue clay with a solution of soda ash to heat, next adding a quantity of fine sharp sand and a small percentage of alum, thoroughly mixing the mass, next drying, and finally comminuting.

4. The process of making cement consisting in boiling clay with soda ash in water, then adding the necessary quantity of sand and alum, thoroughly mixing the mass, then drying, and finally comminuting.

5. The process of making cement consisting of boiling clay with soda ash in water to thoroughly saturate the clay with the soda ash, independent of other material to be subsequently added, and after such boiling operation adding sand, mixing the mass and comminuting.

In testimony whereof I affix my signature in presence of two witnesses.

ELI ROY.

Witnesses:
    LYDIA W. LEVESQUE,
    ALFRED DELORME.